United States Patent
Hsu et al.

(10) Patent No.: US 11,539,114 B2
(45) Date of Patent: Dec. 27, 2022

(54) ELECTRONIC DEVICE

(71) Applicant: Chiun Mai Communication Systems, Inc., New Taipei (TW)

(72) Inventors: Cho-Kang Hsu, New Taipei (TW); Min-Hui Ho, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 84 days.

(21) Appl. No.: 17/307,159

(22) Filed: May 4, 2021

(65) Prior Publication Data

US 2021/0359393 A1 Nov. 18, 2021

(30) Foreign Application Priority Data

May 15, 2020 (CN) .......................... 202010414590.8

(51) Int. Cl.
*H01Q 1/24* (2006.01)
*H01Q 13/10* (2006.01)
*H04M 1/02* (2006.01)
*H01Q 21/06* (2006.01)
*H01Q 9/42* (2006.01)

(52) U.S. Cl.
CPC .............. *H01Q 1/243* (2013.01); *H01Q 9/42* (2013.01); *H01Q 13/10* (2013.01); *H01Q 21/064* (2013.01); *H04M 1/0216* (2013.01); *H04M 1/0268* (2013.01); *H04M 2250/16* (2013.01)

(58) Field of Classification Search
CPC .......... H01Q 1/242; H01Q 1/243; H01Q 1/36; H01Q 1/48; H01Q 1/50; H01Q 9/0407; H01Q 9/42; H01Q 5/371; H01Q 13/10; H04M 1/0216; H04M 1/0268
See application file for complete search history.

(56) References Cited

U.S. PATENT DOCUMENTS

2017/0117611 A1* 4/2017 Lepe .................. H01Q 13/10
2020/0127384 A1* 4/2020 Thakur ............... H01Q 21/064

FOREIGN PATENT DOCUMENTS

| CN | 205811047 U | * 12/2016 | ............... H01Q 1/36 |
| CN | 106711599 A | * 5/2017 | ........... H01Q 1/2266 |
| CN | 107887696 A | 4/2018 | |
| JP | 2017228982 A | * 12/2017 | ............. H01Q 13/10 |
| TW | 201427177 A | 7/2014 | |

* cited by examiner

*Primary Examiner* — Hoang V Nguyen
(74) *Attorney, Agent, or Firm* — ScienBiziP, P.C.

(57) ABSTRACT

An antenna for a foldable electronic device which functions equally well in both folded and unfolded states includes a rotating shaft and a housing. The overall housing is made of metallic material and includes a first housing and a second housing. The first housing connects to the second housing through the rotating shaft. The housing further defines at least one group of slots to form at least one slot antenna. The at least one slot antenna crosses the rotating shaft and extends to the first housing and/or the second housing. By setting at least one slot antenna to correspond to the rotating shaft, the foldable electronic device achieves high radiation performance whether the first and second housing are folded or unfolded.

19 Claims, 8 Drawing Sheets

ELECTRONIC DEVICE

FIELD

The subject matter herein generally relates to wireless communications, to an electronic device.

BACKGROUND

Flexible displays allow foldable electronic devices (such as mobile phones) to be made. The electronic device includes a bending region between a first region and a second region. The bending region can be deformed to fold or unfold the first region relative to the second region. When the electronic device is unfolded, it can realize a large screen display. When the electronic device is in a folded state, it is easy to store and carry.

In addition, when the electronic device communicates with a base station or other electronic devices, the electronic device needs to transmit an uplink signal and receive a downlink signal, through an antenna. Then, the electronic device can realize data interaction with the base station or other electronic devices. However, requirements of a display screen are higher, and a design of the antenna of the electronic device becomes more difficult, the performance of the antenna in the folded and unfolded states can be affected.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
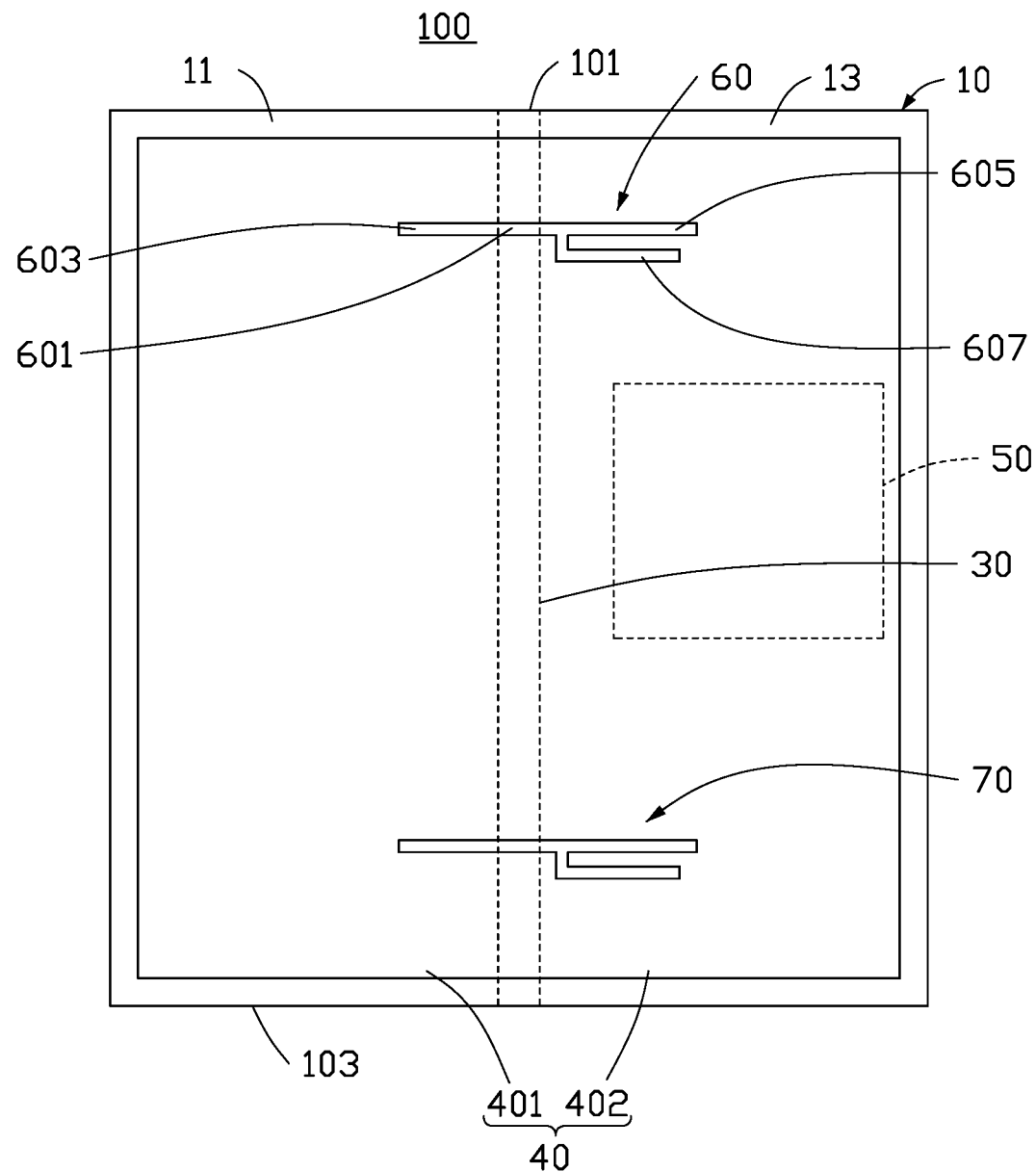
FIG. 1 is a schematic diagram of an embodiment of an unfolded electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an electronic device.

Figure 2:
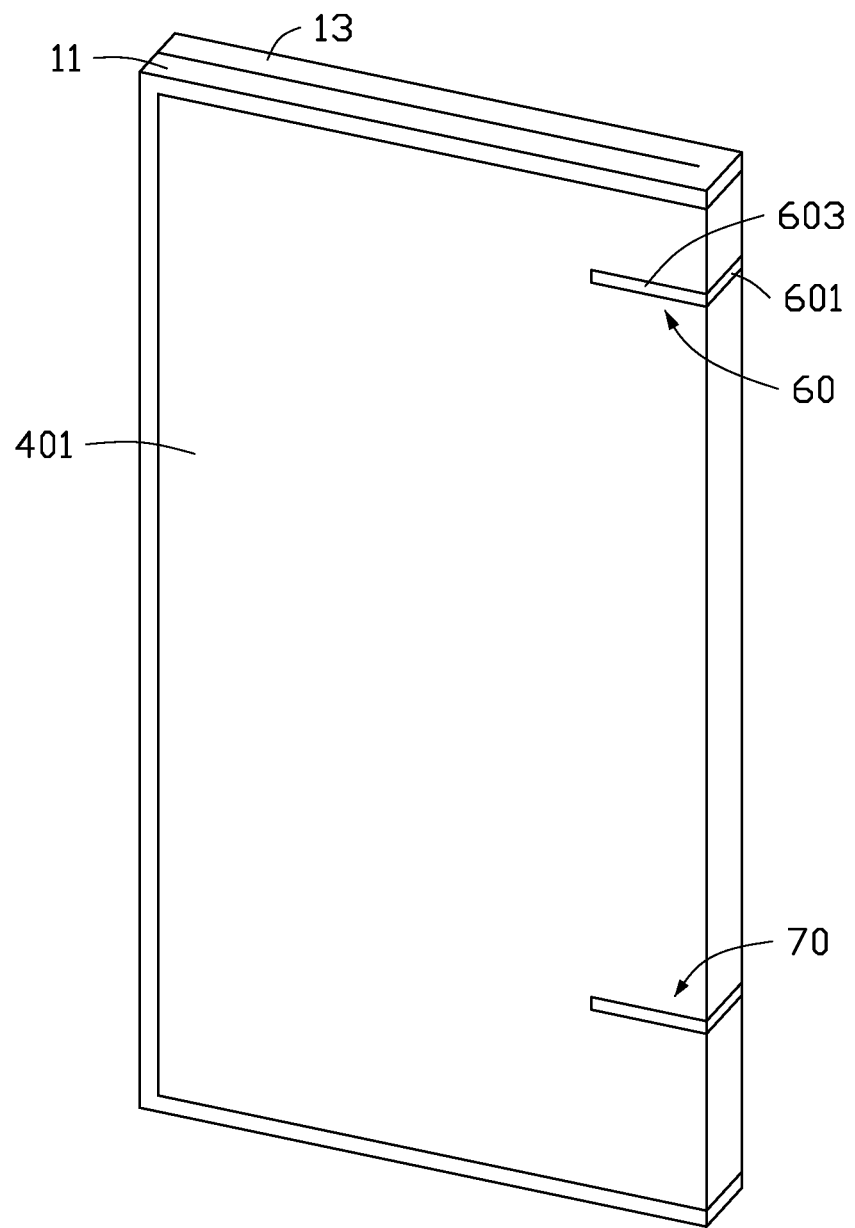
FIG. 2 is similar to FIG. 1, but the electronic device is folded.
Figure 3:
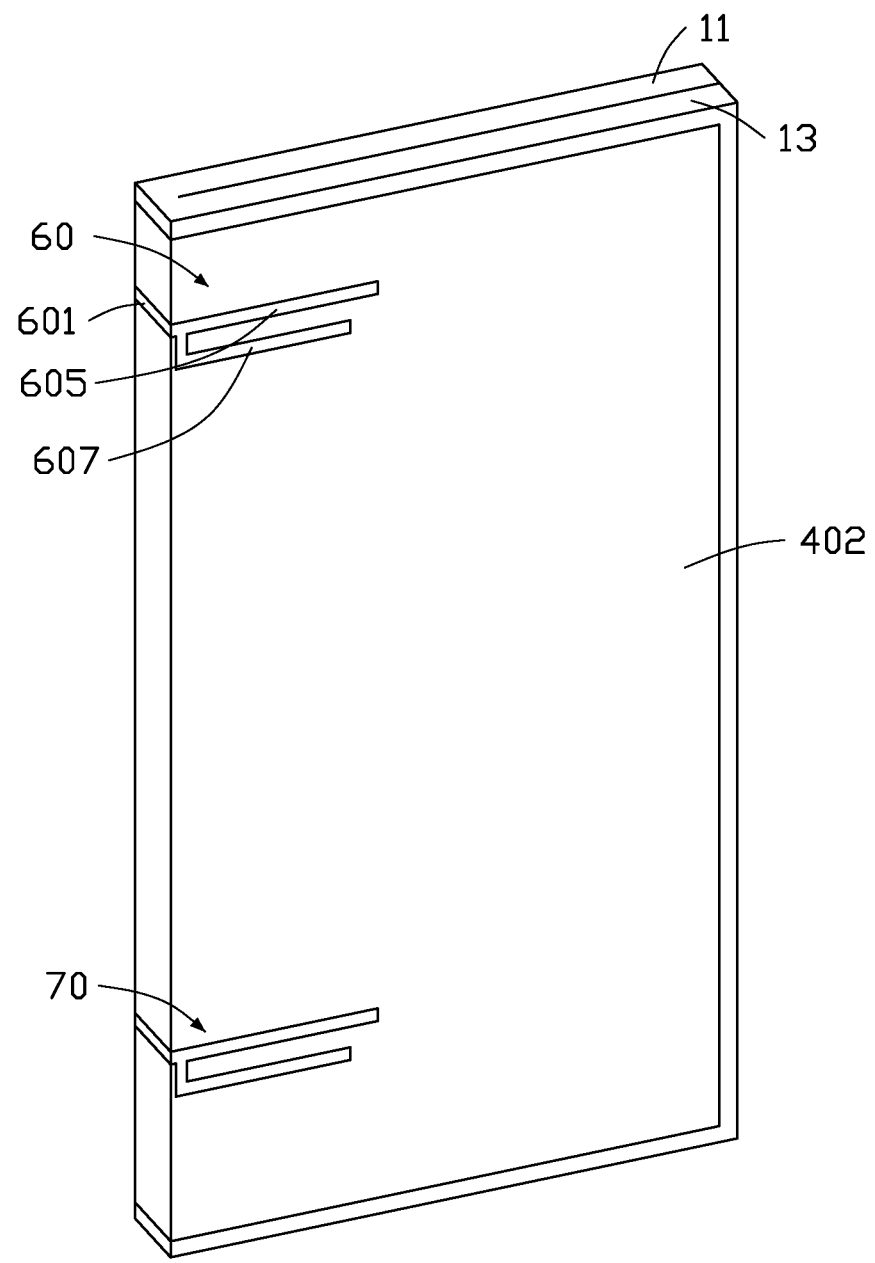
FIG. 3 is similar to FIG. 2, but shown from another angle.

FIG. 1, FIG. 2, and FIG. 3 illustrate an embodiment of an electronic device 100. The electronic device 200 can be, for example, a smart phone, a tablet computer, a wearable device, or other electronic device with a flexible and foldable display screen.

In this embodiment, the electronic device 100 includes a housing 10, a rotating shaft 30, a display screen 40, and a circuit board 50.

The housing 10 includes a first housing 11 and a second housing 13. The first housing 11 and the second housing 13 are two rotatable portions of the electronic device 100. The rotating shaft 30 is arranged inside the electronic device 100 and is arranged at a connection of the first housing 11 and the second housing 13. The first housing 11 and the second housing 13 are connected through the rotating shaft 30 and can rotate relative to each other. For example, the first housing 11 rotates around the rotating shaft 30. Selectively, the second housing 13 rotates around the rotating shaft 30. In this embodiment, the first housing 11, the second housing 13, and the rotating shaft 30 are all made of metal or other conductive materials.

The display screen 40 can be a flexible display screen. In this embodiment, the display screen 40 includes a first display area 401 and a second display area 402. The first display area 401 is arranged on the first housing 11. The second display area 402 is arranged on the second housing 13. In other embodiments, the display screen 40 is not limited to being a flexible display screen. For example, the display screen 40 can also include two independent display screens, which are set in the manner of a diptych corresponding to the first display area 401 and the second display area 402, connected by the rotating shaft 30.

When the first housing 11 rotates relative to the second housing 13, the display screen 40 is folded or unfolded. For example, when the first housing 11 and the second housing 13 rotate relative to each other so that the electronic device 100 is in a folded state, the first display area 401 of the display screen 40 positioned on the first housing 11 and the second display area 402 positioned on the second housing 13 can be arranged in a back-to-back configuration, so that the first display area 401 and the second display area 402 are arranged on opposite sides of the electronic device 100. For example, the first display area 401 and the second display area 402 are arranged on front and rear sides of the electronic device 100. Then, the first display area 401 and the second display area 402 can be used as the front and back of the electronic device 100, respectively. In this way, one of the first display area 401 and the second display area 402 can be used as a main display screen, while the other one can be used as a secondary display screen or directly in an off-screen state.

When the first housing 11 and the second housing 13 are rotated relative to each other so that the electronic device 100 is unfolded, the display screen 40 can be spread out on the first housing 11 and the second housing 13. In this way, the electronic device 100 may constitute a large single-screen electronic device, such as a tablet computer.

In this embodiment, the display screen 40 may be, but is not limited to, a liquid crystal display (LCD) or an organic light-emitting diode (OLED) display screen, etc. The display screen 40 is configured to display information, such as images and text.

The circuit board 50 is positioned in the housing 10. For example, the circuit board 50 is positioned inside the first housing 11 and/or the second housing 13. The circuit board 50 and the display screen 40 are stacked against each other. For example, the circuit board 50 may be arranged under the display screen 40.

In this embodiment, the circuit board 50 may be a main board of the electronic device 100. The display screen 40 is electrically connected to the circuit board 50. Correspondingly, a display control circuit (not shown) is provided on the circuit board 50. The display control circuit outputs a control signal to the display screen 40 to control the display screen 40 to display information. The circuit board 50 also includes a signal feed point and a system ground point (not shown), which feed electrical current and signals, and provide grounding, to an antenna of the electronic device 100 (see details below).

In other embodiments, the electronic device 200 may also include one or more of the following components, such as a processor, a circuit board, a memory, a power supply component, an input/output circuit, an audio component (such as a microphone and a speaker, etc.), an imaging component (for example, a front camera and/or a rear camera), and several sensors (such as a proximity sensor, a distance sensor, an ambient light sensor, an acceleration sensor, a gyroscope, a magnetic sensor, a pressure sensor and/or a temperature sensor, etc.), which are not detailed here.

As illustrated in FIG. 2 and FIG. 3, the housing 10 further defines at least one slot to form at least one slot antenna. For example, in this embodiment, the housing 10 defines two groups of slots, and then two slot antennas 60 and 70 are formed to transmit radio frequency signals. The transmission of radio frequency signals by the slot antennas 60 and 70 can be understood as transmitting or receiving radio frequency signals, or transmitting and receiving radio frequency signals at the same time.

In this embodiment, the slot antenna 60 is positioned at a location of the housing 10 approximately one third along the length of the electronic device 100 from a first end 101, crosses the rotating shaft 30, and extends at least to the housing 11 and/or the second housing 13. That is, the housing 10 defines a slot at a location corresponding to the rotating shaft 30, and defines one or more slots at the location of the housing 10 other than the rotating shaft 30, thereby forming the slot antenna 60. The slot antenna 60 is able to activate corresponding radiation frequency bands, such as 5G communication frequency band N78 (3300-3800 MHz), N79 (4400-5000 MHz), and ultra-high frequency band (3400-3800 MHz).

In detail, in this embodiment, the housing 10 defines a first slot 601 at a location corresponding to the rotating shaft 30. The first slot 601 is substantially straight and is substantially parallel to the first end 101. The housing 10 defines three slots at a location other than the rotating shaft 30, such as a second slot 603, a third slot 605, and a fourth slot 607. In this embodiment, the second slot 603 is substantially straight and is substantially parallel to the first end 101. The second slot 603 is positioned on the first housing 11 and communicates with the first slot 601.

The third slot 605 is substantially L-shaped. The third slot 605 is defined on the second housing 13 and communicates with the first slot 601. Specifically, one end of the third slot 605 extends in a direction parallel to the first end 101 and toward the first slot 601 to communicate with the first slot 601 to form a horizontal section. The third slot 605 then extends along a direction perpendicular to the first slot 601 and away from the first end 101 to form a vertical section, so that the third slot 605 forms the L-shaped structure.

The fourth slot 607 is substantially L-shaped. The fourth slot 607 is defined on the second housing 13 and communicates with the first slot 601. Specifically, one end of the fourth slot 607 extends in a direction parallel to the first end 101 and toward the first slot 601 so as to be parallel to the horizontal section of the third slot 605. The fourth slot 607 then extends along a direction perpendicular to the first slot 601 and close to the first end 101, and then communicates with the vertical section of the third slot 605 to form the L-shaped structure.

As illustrated in FIG. 1, when the electronic device 100 is unfolded, the horizontal sections of the first slot 601, the second slot 603, and the third slot 605 are located on a single straight line. The horizontal section of the third slot 605 is positioned to be parallel with the horizontal section of the fourth slot 607. The horizontal section of the third slot 605 is longer than the horizontal section of the fourth slot 607. The vertical section of the third slot 605 and the vertical section of the fourth slot 607 are positioned on a single straight line and communicate with each other.

Since the housing 10 defines the first slot 601, the second slot 603, the third slot 605, and the fourth slot 607, an inverted F-shaped slot antenna is formed, namely the slot antenna 60. The slot antenna 60 can be activated and couple in multiple resonance modes, so that the electronic device 100 works in the above-mentioned frequency bands, namely, the 5G communication frequency bands N78 (3300-3800 MHz), N79 (4400-5000 MHz), and ultra-high frequency bands (3400-3800 MHz).

Figure 4:
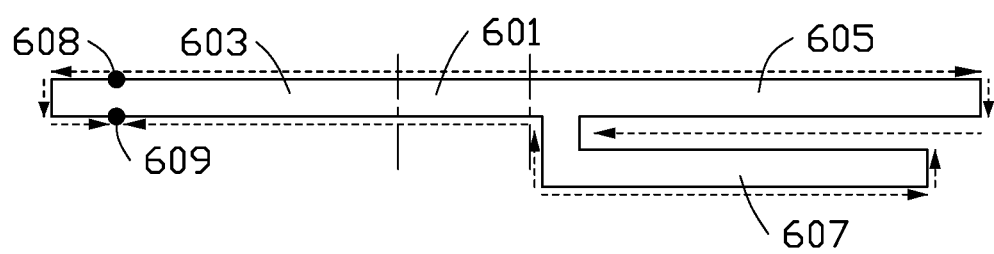
FIG. 4 is a current path distribution graph of a slot antenna when the electronic device is unfolded.
Figure 5:
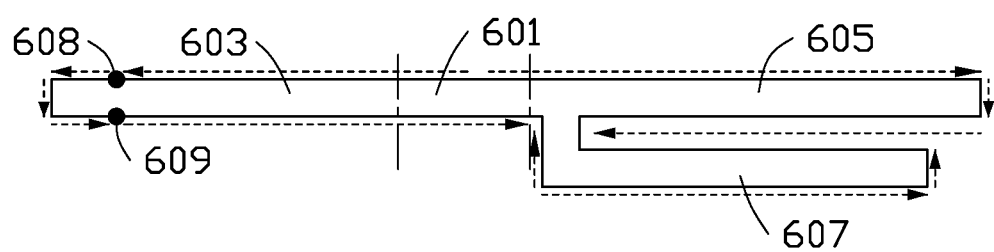
FIG. 5 is a current path distribution graph of the slot antenna when the electronic device is folded.

In this embodiment, the slot antenna 60 further includes a feed point 608 and a ground point 609 (shown in FIG. 4 and FIG. 5). The feed point 608 is electrically connected to the slot antenna 60, for example, point 608 is electrically connected to the second slot 603 of the slot antenna 60. The feed point 608 can also be electrically connected to the signal feed point on the circuit board 50 by means of an elastic sheet, a microstrip line, a strip line, a coaxial connection or the like, so as to feed current and signal to the slot antenna 60. The ground point 609 is electrically connected to the slot antenna 60, for example, point 609 is electrically connected to one end of the second slot 603. The ground point 609 is also electrically connected to the system ground point on the circuit board 50 for grounding the slot antenna 60.

As illustrated in FIG. 4 and FIG. 5, FIG. 4 is a current path distribution graph of the slot antenna 60 when the electronic device 100 is in the unfolded state and works at a frequency of about 3.9 GHz. FIG. 5 is a current path distribution graph of the slot antenna 60 when the electronic device 100 is in the folded state and works at the frequency of about 3.9 GHz.

As illustrated in FIG. 4 and FIG. 5, the slot antenna 60 is an inverted F-shaped slot antenna, which can be activated and coupled in multiple resonance modes to achieve a broadband effect, and then work in a 5G communication frequency band, such as the N78 frequency band (3300-3800 MHz) and N79 frequency band (4400-5000 MHz), while covering the ultra-high frequency band (3400-3800 MHz).

In this embodiment, by adjusting lengths and widths of the third slot 605 and the fourth slot 607 of the slot antenna 60, operating frequencies of the slot antenna 60 can be adjusted. For example, electrical lengths of the third slot 605 and the fourth slot 607 can be adjusted, for example, the electrical lengths can be reduced, so that the frequencies of the slot antenna 60 are shifted toward higher frequencies. Conversely, the frequencies of the slot antenna 60 can be shifted toward lower frequencies by lengthening the electrical lengths.

In this embodiment, the slot antenna 70 is positioned at a location of the housing 10 approximately two thirds along the length of the electronic device 100 from the first end 101, and is arranged to be symmetrical with the slot antenna 60. The structure and working principle of the second slot antenna 70 are the same as those of the slot antenna 60, and will not be repeated here. For example, in this embodiment, the housing 10 can be divided into three equal portions from top to bottom to form a first portion, a second portion, and a third portion. The first portion corresponds to the upper portion, the second portion corresponds to the middle portion, and the third portion corresponds to the lower portion. The slot antenna 60 is located on the first portion of the housing 10 and is located on a location approximately one third down from the first end 101. The slot antenna 70 is located on the third portion of the housing 10 and is located on a location approximately one third up from the second end 103. Thereby, the slot antenna 60 and the slot antenna 70 are arranged symmetrically.

In this embodiment, the two slot antennas 60 and 70 are arranged to be symmetrical and to both work in the 5G communication frequency bands, such as the N78 frequency band (3300-3800 MHz) and the N79 frequency band (4400-5000 MHz), and to both work in the ultra-high frequency band (3400-3800 MHz). Then, the two slot antennas 60 and 70 can form a 2*2 MIMO antenna structure, which can effectively improve the bandwidth and efficiencies of the N78 frequency band, N78 frequency band, and the ultra-high frequency band. Compared to a general antenna formed by a metal housing, the radiation of the electronic device 100 has better broadband effect and better radiation efficiency.

Figure 6A:
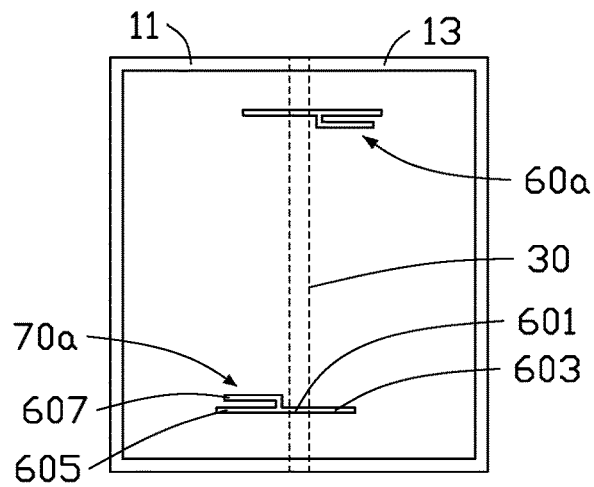
FIG. 6a to FIG. 6c are schematic diagrams of the slot antenna of FIG. 1.
Figure 6B:
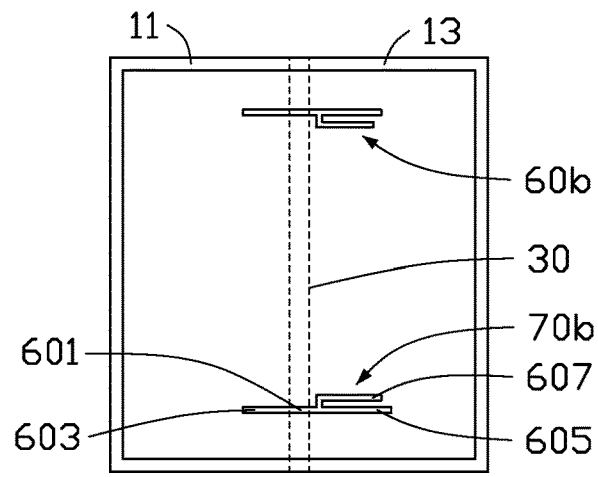
Figure 6C:
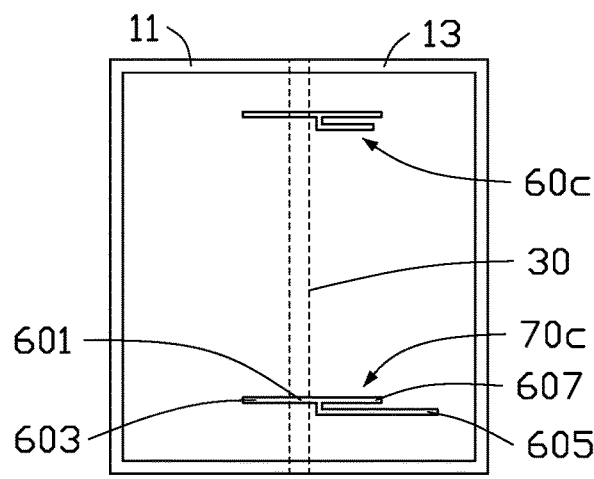

As illustrated in FIG. 6a, FIG. 6b, and FIG. 6c together, in other embodiments, the slot antennas 60 and 70 can also be arranged asymmetrically. The locations of the slot antennas 60 and 70 can be interchanged or adjusted according to requirements. Selectively, in other embodiments, the structure of the slot antennas 60 and 70 may be not the same, and the two slot antennas 60 and 70 may have different styles.

For example, as illustrated in FIG. 6a, the structure and arrangement location of the slot antenna 60a are the same as those of the slot antenna 60. The location of the slot antenna 70a is different from the slot antenna 70. For example, locations of the feed point and the ground point of the slot antenna 60a are different from those of the slot antenna 70a. Specifically, the slot antenna 70a is arranged to be entirely on the rotating shaft 30 and extending to the first housing 11 and the second housing 13. The first slot 601 of the slot antenna 70a is defined to correspond to the rotating shaft 30. The second slot 603 of the slot antenna 70a is defined on the second housing 13. The third slot 605 and the fourth slot 607 are defined on the first housing 11. The fourth slot 607 is arranged to face the slot antenna 60a. In other embodiments, the fourth slot 607 can also be defined away from the slot antenna 60a.

As illustrated in FIG. 6b, the structure and location of the slot antenna 60b are the same as those of the slot antenna 60. The structure of the slot antenna 70b is the same as that of the slot antenna 70. The only difference is that the fourth slot 607 of the slot antenna 70b is defined to face the slot antenna 60b instead of facing away from the slot antenna 60b.

As illustrated in FIG. 6c, the structure and location of the slot antenna 60c are the same as those of the slot antenna 60. The location of the slot antenna 70c is the same as that of the slot antenna 70. A structure of the slot antenna 70c is also roughly the same as that of the slot antenna 70, the only difference is that the horizontal section of the fourth slot 607 of the slot antenna 70c is longer than the horizontal section of the third slot 605.

Figure 7:
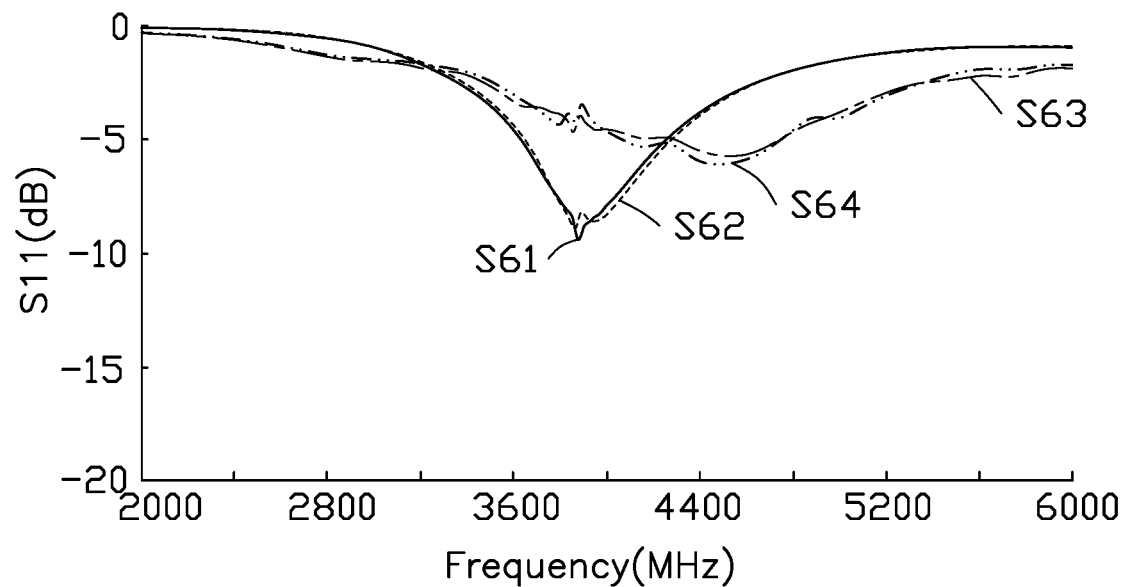
FIG. 7 is a scattering parameter graph of the electronic device of FIG. 1.

FIG. 7 is a graph of scattering parameters (S parameters) of the electronic device 100. A curve S61 is an S11 value of the slot antenna 60 when the electronic device 100 is unfolded. A curve S62 is an S11 value of the slot antenna 70 when the electronic device 100 is unfolded. A curve S63 is an S11 value of the slot antenna 60 when the electronic device 100 is in the folded state. A curve S64 is an S11 value of the slot antenna 70 when the electronic device 100 is in the folded state.

Figure 8:
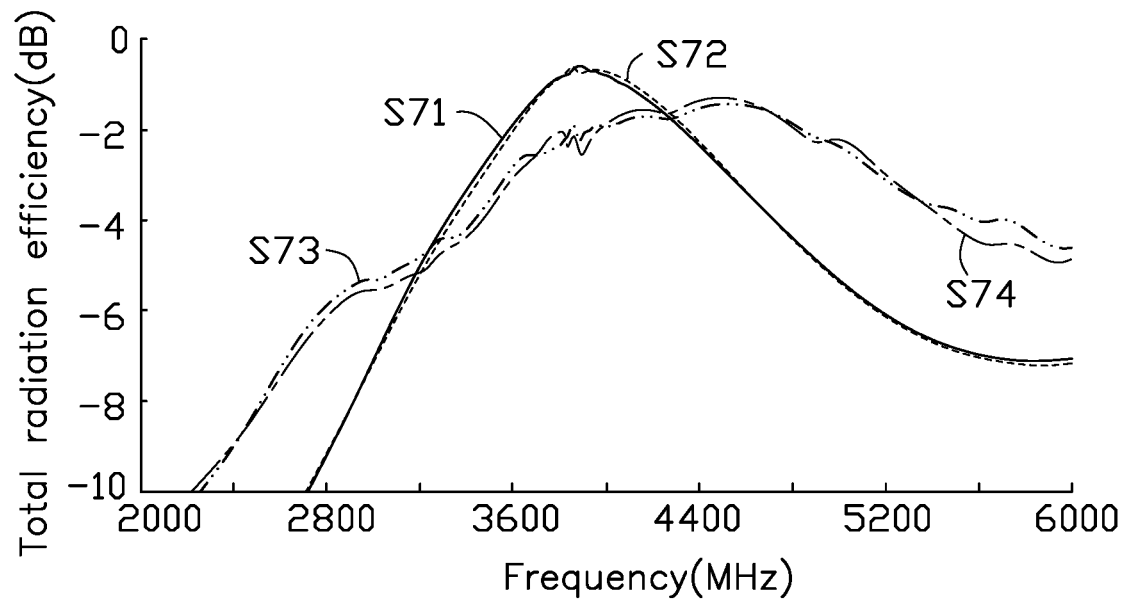
FIG. 8 is a total radiation efficiency graph of the electronic device of FIG. 1.

FIG. 8 is a graph of total radiation efficiency of the electronic device 100. A curve S71 is a total radiation efficiency of the slot antenna 60 when the electronic device 100 is unfolded. A curve S72 is a total radiation efficiency of the slot antenna 70 when the electronic device 100 is unfolded. A curve S73 is a total radiation efficiency of the slot antenna 60 when the electronic device 100 is in the folded state. A curve S74 is a total radiation efficiency of the slot antenna 70 when the electronic device 100 is in the folded state.

As described above, in the electronic device 100, when the first housing 11 and the second housing 13 are flat and unfolded, the display screen 40 can be spread out on the first housing 11 and the second housing 13 for complete display of content, that is, a larger screen display area can be formed for use as a tablet computer. When the electronic device 100 is in a folded state, the electronic device 100 can be used as a handheld communication device that can be put into a pocket, which is more convenient. In other words, the electronic device 100 meets the needs of mobile phones and tablet computers at the same time.

In addition, through setting the slot antennas 60 and 70 to correspond to the rotating shaft 30, when the first housing 11 and the second housing 13 are folded or unfolded, the electronic device 100 can activate the 5G N78, N79 communication frequency bands and UHF frequency band. The electronic device 100 can achieve better radiation performance and is not affected by being in the folded or unfolded states of the first housing 11 and the second housing 13, so as to improve the stability of the electronic device 100 when communicating with a base station or other electronic device.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device comprising:
a rotating shaft;
a housing, the housing made of metallic material and comprising a first housing and a second housing, the first housing connecting to the second housing through the rotating shaft;
wherein the housing further defines at least one group of slots to form at least one slot antenna, the at least one slot antenna crosses the rotating shaft and extends to the first housing and/or the second housing.

2. The electronic device of claim 1, wherein the at least one slot antenna defines a slot on a location of the housing corresponding to the rotating shaft, and defines one or a plurality of slots on the location of the housing other than the rotating shaft, to form the at least slot antenna.

3. The electronic device of claim 2, wherein the at least one slot antenna defines a first slot, a second slot, a third slot, and a fourth slot, the first slot is defined at a location corresponding to the rotating shaft and is substantially parallel to a first end of the electronic device;
wherein the second slot is defined on the first housing and communicates with the first slot, the second slot is substantially straight and is substantially parallel to the first end;
wherein the third slot is defined on the second housing, one end of the third slot extends in a direction parallel to the first end and toward the first slot to communicate with the first slot to form a horizontal section, the third slot then extends along a direction perpendicular to the first slot and away from the first end to form a vertical section;
wherein the fourth slot is defined on the second housing, one end of the fourth slot extends in a direction parallel to the first end and toward the first slot to be parallel with the horizontal section of the third slot, the fourth slot then extends along a direction perpendicular to the first slot and toward the first end to communicate with the vertical section of the third slot.

4. The electronic device of claim 3, wherein the at least one slot antenna further comprises a feed point and a ground point, the feed point is electrically connected to the at least one slot antenna for feeding electrical signals to the at least one slot antenna, the ground point is electrically connected to the at least one slot antenna for grounding the at least one slot antenna;
wherein the first slot, the second slot, the third slot, and the fourth slot cooperatively form an inverted F-shaped slot antenna to activate and couple multiple resonance modes.

5. The electronic device of claim 3, wherein the horizontal section of the third slot is longer than the horizontal section of the fourth slot.

6. The electronic device of claim 1, wherein the housing defines two groups of slots to form two slot antennas.

7. The electronic device of claim 6, wherein one of the two slot antennas is positioned at a location of the housing approximately one third close to a first end of the first housing, the other one of the two slot antennas is positioned at a location of the housing approximately one third close to a second end of the first housing, the second end is positioned opposite to the first end, the two slot antennas are arranged symmetrically or asymmetrically with each other.

8. The electronic device of claim 6, wherein the two slot antennas have different structures.

9. The electronic device of claim 1, further comprising a display screen, wherein the display screen comprises a first display area and a second display area, the first display area is arranged on the first housing, and the second display area is arranged on the second housing.

10. The electronic device of claim 1, wherein when the first housing and the second housing rotate relative to each other so that the electronic device is in a folded state, the electronic device activates and couples a plurality of resonance modes through the at least one slot antenna;
wherein when the first housing and the second housing rotate relative to each other so that the electronic device is in an expanded state, the electronic device activates and couples a plurality of resonance modes through the at least one slot antenna.

11. An electronic device comprising:
a rotating shaft;
a housing, the housing made of metallic material and comprising a first housing and a second housing, the first housing connecting to the second housing through the rotating shaft;
wherein the housing further defines two groups of slots to form two slot antennas, the two slot antennas both cross the rotating shaft and extend to the first housing and the second housing.

12. The electronic device of claim 11, wherein each of the two slot antennas defines a slot on a location of the housing corresponding to the rotating shaft, and defines a plurality of slots on the location of the housing other than the rotating shaft.

13. The electronic device of claim 12, wherein each of the two slot antennas defines a first slot, a second slot, a third slot, and a fourth slot, the first slot is defined at a location corresponding to the rotating shaft and is substantially parallel to a first end of the electronic device;
wherein the second slot is defined on the first housing and communicates with the first slot, the second slot is substantially straight and is substantially parallel to the first end;
wherein the third slot is defined on the second housing, one end of the third slot extends in a direction parallel to the first end and toward the first slot to communicate with the first slot to form a horizontal section, the third slot then extends along a direction perpendicular to the first slot and away from the first end to form a vertical section;
wherein the fourth slot is defined on the second housing, one end of the fourth slot extends in a direction parallel to the first end and toward the first slot to be parallel with the horizontal section of the third slot, the fourth slot then extends along a direction perpendicular to the first slot and toward the first end to communicate with the vertical section of the third slot.

14. The electronic device of claim 13, wherein each of the two slot antennas defines further comprises a feed point and a ground point, the feed point is electrically connected to one slot antenna for feeding electrical signals to the slot antenna, the ground point is electrically connected to one slot antenna for grounding the slot antenna;
wherein the first slot, the second slot, the third slot, and the fourth slot cooperatively form an inverted F-shaped slot antenna to activate and couple multiple resonance modes.

15. The electronic device of claim 13, wherein the horizontal section of the third slot is longer than the horizontal section of the fourth slot.

16. The electronic device of claim 11, wherein one of the two slot antennas is positioned at a location of the housing approximately one third close to a first end of the first housing, the other one of the two slot antennas is positioned at a location of the housing approximately one third close to a second end of the first housing, the second end is positioned opposite to the first end, the two slot antennas are arranged symmetrically with each other.

17. The electronic device of claim 16, wherein the two slot antennas have same structures.

18. The electronic device of claim 11, further comprising a display screen, wherein the display screen comprises a first display area and a second display area, the first display area is arranged on the first housing, and the second display area is arranged on the second housing.

19. The electronic device of claim 11, wherein when the first housing and the second housing rotate relative to each other so that the electronic device is in a folded state, the electronic device activates and couples a plurality of resonance modes through the two slot antennas;

wherein when the first housing and the second housing rotate relative to each other so that the electronic device is in an expanded state, the electronic device activates and couples a plurality of resonance modes through the two slot antennas.

* * * * *